Nov. 10, 1942.  O. LUTZ  2,301,667
ROTARY COMPRESSORS AND OTHER ENGINES
Filed March 25, 1939  4 Sheets-Sheet 1
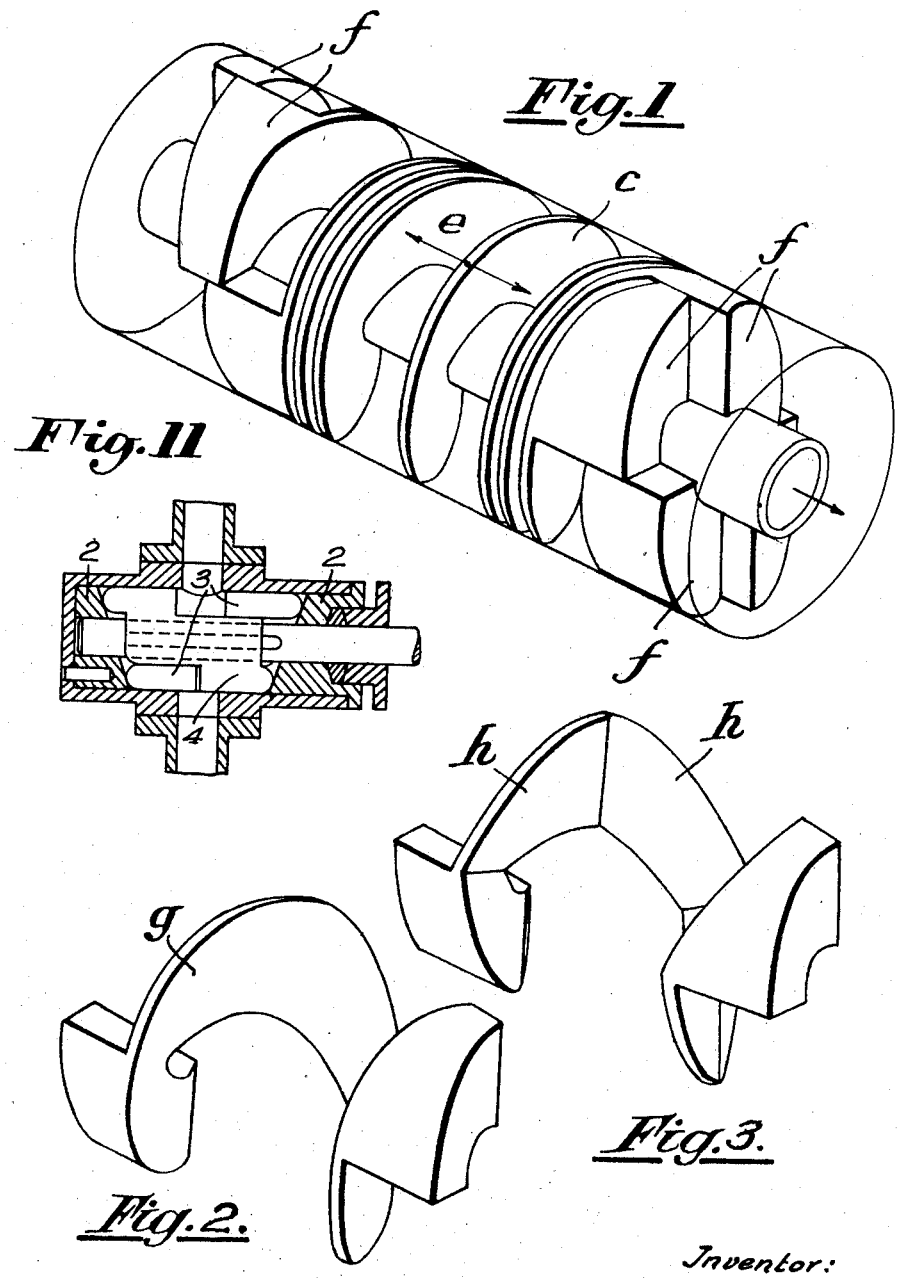
Inventor:
Otto Lutz
by Francis E. Boyce
Atty.

Inventor:
Otto Lutz
by Francis E. Boyce
Atty.

Nov. 10, 1942.                    O. LUTZ                    2,301,667
                    ROTARY COMPRESSORS AND OTHER ENGINES
              Filed March 25, 1939            4 Sheets-Sheet 3
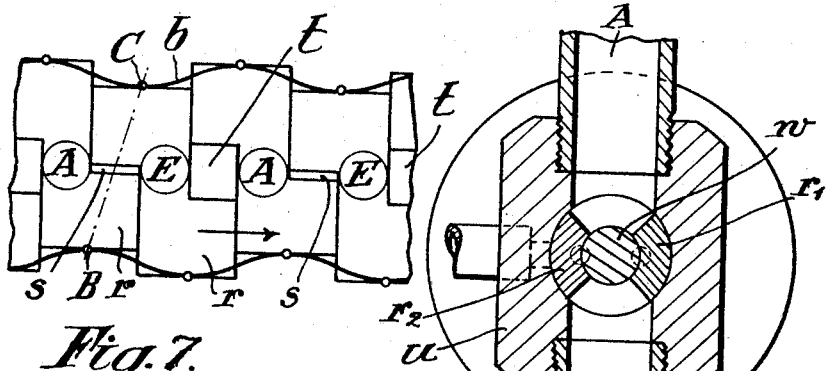
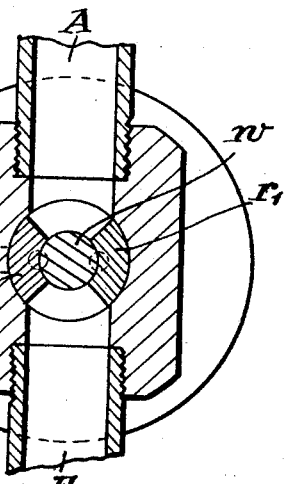
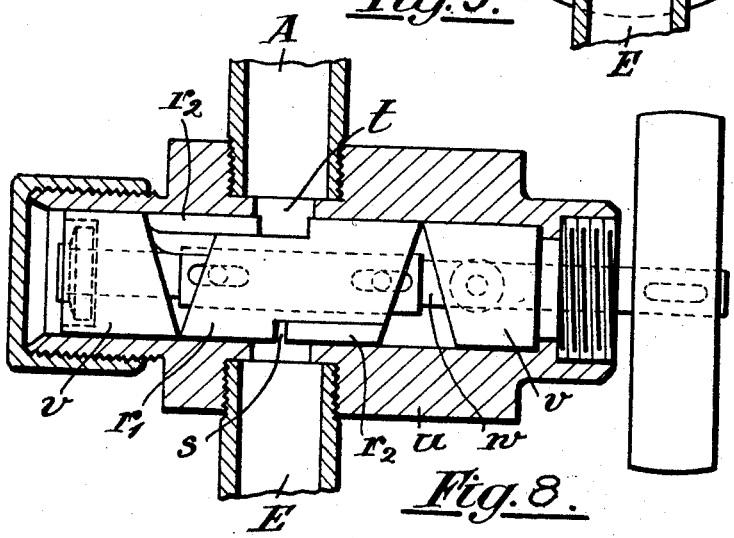
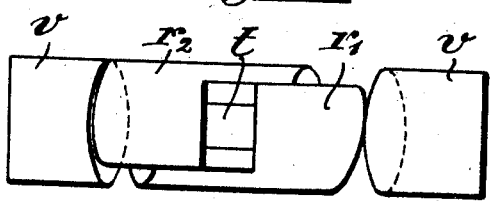
Inventor:
Otto Lutz
by Francis E. Boyce
Atty.

Nov. 10, 1942.    O. LUTZ    2,301,667
ROTARY COMPRESSORS AND OTHER ENGINES
Filed March 25, 1939    4 Sheets-Sheet 4

Inventor:
Otto Lutz
by Francis E. Boyce
Atty.

Patented Nov. 10, 1942

2,301,667

UNITED STATES PATENT OFFICE 2,301,667

ROTARY COMPRESSOR AND OTHER ENGINES

Otto Lutz, Brunswick-Querum, Germany; vested in the Alien Property Custodian

Application March 25, 1939, Serial No. 264,183
In Germany March 28, 1938

3 Claims. (Cl. 230—173)

My invention relates to compressors and other engines and more particularly to means for compressing gases and for transforming gas pressure into kinetic energy.

It has particular reference to apparatus of the kind disclosed in my patent of the United States No. 2,127,126, in which a plurality of walls extend across a working chamber, these walls, when moving in the chamber relative to each other, continuously and alternately increase and diminish the volume of the spaces enclosed between them, whereby the apparatus is enabled to either compress and convey gases or to transform energy stored in a compressed gas into pressure acting on another gas or to convert heat energy into mechanical energy.

It is an object of my invention to so design the helical pistons, which constitute essential parts of such engine, in a manner whereby their construction and manufacture is greatly simplified.

With this and other objects in view I am now going to describe my invention more in detail, having reference to the drawings affixed to this specification and forming part thereof, in which several embodiments of this invention are illustrated diagrammatically by way of example.

In the drawings:

Fig. 1 is a perspective diagrammatic showing of a shaft, helical pistons and cams constituting the most important parts of the apparatus disclosed in my U. S. patent mentioned above.

Fig. 2 illustrates one of the helical pistons appearing in Fig. 1.

Fig. 3 is a perspective view of a modified form of this piston which embraces the present invention.

Fig. 7 is a diagram illustrating the operation of the device when fitted out with two pistons according to this invention which move between two guide surfaces controlling the piston movements.

Fig. 8 is an axial section of an entire engine according to this invention, and

Fig. 9 is a cross section along the axis of the tubes A and E in Fig. 8.

Fig. 10 is a plan view of the pistons of the same engine.

Figs. 11–16 illustrate means for controlling the quantity of gas or the like conveyed or compressed by an engine of the kind here in view independently of the number of revolutions, Fig. 11 showing an engine of the known type, the operation of which shall be improved by means of regulating devices such as shown in the following figures.

Fig. 12 is an axial section of another means according to this invention for controlling the quantity of gas conveyed by the engine, Fig. 13 being a corresponding end view.

Fig. 14 is a perspective view of a piston adapted for use in connection with a device according to Fig. 12.

Fig. 15 is a development of such a piston in the case where an even number of conveying points is provided, Fig. 16 being a similar showing for an odd number.

In compressors of the kind described in my prior Patent No. 2,127,126 the pistons were formed as helical walls, the curved surfaces of which constituted active piston surfaces providing the pressure required to convey the gases or liquids supplied into the machine. According to this invention I replace these active helical surfaces by plane surfaces without thereby in any way reducing the performance. Since a piston formed with plane surfaces can be manufactured in a simpler manner and with less expense, the provision of such pistons forms a decided advance in this particular art.

Figure 4:
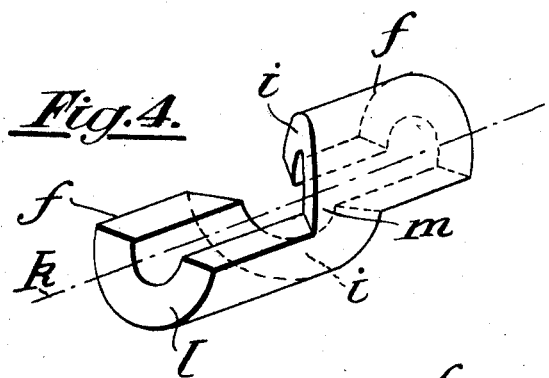
Figs. 4, 5 and 6 are perspective views of three further modifications of such a piston according to the present invention.

The least number of pistons which must be present in an engine of this type is two and in that case the guide piece $f$ (Fig. 1) of a piston fills one half of the cross-sectional area of the space enclosed between the casing and the shaft. The simplest form of a piston, in which the active piston surface $g$ in Fig. 2 or $h$ in Fig. 3 consists of only one plane surface, is obtained, if according to Fig. 4 the plane piston surface $i$ extends obliquely with respect to the piston axis $k$. In the piston according to Fig. 4 the active piston surface as far as the quantity of gas is concerned corresponds to the axial projection of the surface $i$, i. e. to one half of the aforesaid cross-sectional area. Thus the active piston surface is equal to the cross-sectional area $l$ of a guide piece $f$.

On the other hand, if the active piston surface shall be larger, one of the forms shown in Figs. 2 and 3 should be used.

If the operation to be carried out with the aid of such an engine requires the action of more than two pistons, the faces of the segmental guide pieces must be correspondingly smaller.

A particularly simple form of a piston is obtained, if the active piston surface can be made smaller than the cross-sectional area of the guide piece $f$.

Figure 5:
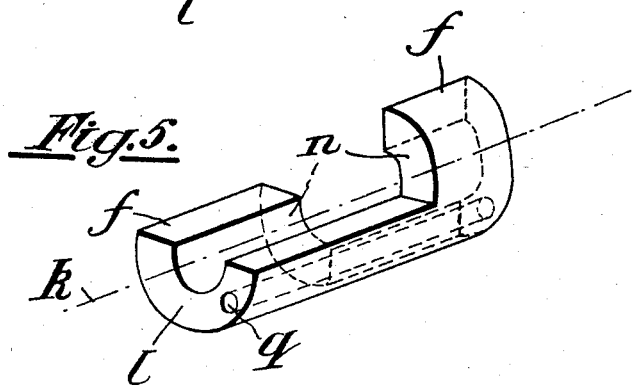

In that case, as shown in Fig. 5, the piston surface $n$ may extend at right angles to the piston axis $k$. In Fig. 5 the piston surface $n$ is one fourth of the aforesaid cross-sectional area of the space enclosed between the casing and the shaft, but it might also be smaller still.

Pistons as here shown can be combined with advantage to form double or triple acting pistons adapted for use in double or triple pumps and other engines, a corresponding number of piston elements of any desired form being assembled together.

I have found it particularly advantageous, as far as the machining of these pistons is concerned, to combine pistons of opposite turns.

Figure 6:
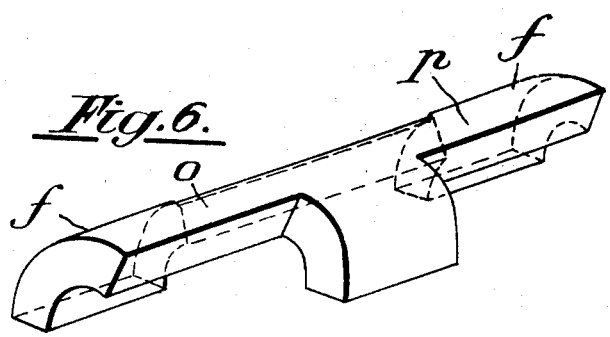

Thus for instance Fig. 6 illustrates a piston, which is a combination of a righthand helical piston $o$ with a left-hand helical piston $p$. In such a piston the annular surface of the guide segments amounts to one third, the piston surface to one sixth of the cross-sectional area of the space enclosed between the casing and the shaft.

Three or more pistons may also be combined in this manner. In all cases longitudinal conduits $q$ may be provided for the purpose of lubrication or cooling.

Fig. 7 is a diagram illustrating the operation of pistons according to this invention. Here the pistons $r$, $r$ form chambers $s$ and $t$ between the active surfaces facing each other, and if the pistons are reciprocated between the walls $b$ in the direction of the arrow, these chambers or spaces will become larger and smaller in alternation. While the small chambers $s$ are thus enlarged, they will move past the intake ports E and will create a suction effect at these ports. On the other hand the larger spaces $t$ in moving past the exhaust ports A, being reduced in volume, will force the gases or other fluid contained therein through these exhaust ports.

In the engine illustrated in Figs. 8–10 cam members $v$ are stationarily mounted in the ends of the cylindrical casing $u$, the parallelly extending cam faces of which form wavy walls acting on the pistons $r_1$ and $r_2$, which are mounted on the shaft $w$ for axial reciprocation, however being secured against circumferential movement relative to the shaft.

When the shaft $w$ rotates, the pistons $r_1$ and $r_2$ are reciprocated in axial direction between the cam faces of the members $v$, however with a phase displacement such that the space enclosed between the two coacting working surfaces of the pistons is enlarged within the circumferential zone in which it faces the intake port E, while its volume is reduced again in the zone, in which it moves past the exhaust port A.

Figure 12:
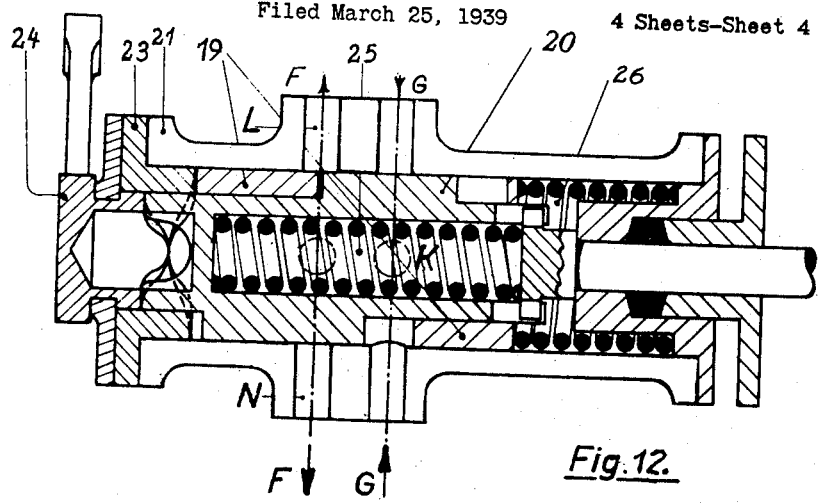
Figure 13:
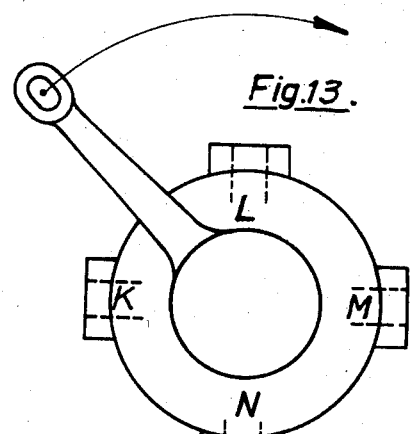

Figs. 12 and 13 illustrate by way of example the application of this invention to a helical piston engine comprising two pistons which execute two strokes during one revolution. Here 19 and 20 are the pistons; piston 19 slides along the cam member 23 fixed in the casing 21, piston 20 moves along the adjustable cam member 24. The pistons are forced against their cam members by means of coil springs 25 and 26, respectively. By turning the cam member 24 the phase displacement of the two pistons is varied and the quantity of fluid conveyed is regulated in a constant manner.

Figure 14:
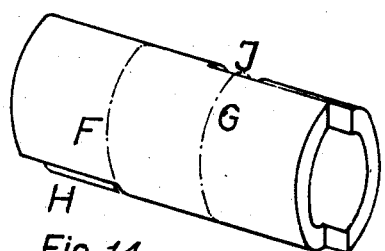

If in such unit the middle planes F and G of the working chambers H and J in Figs. 12–14 are arranged in staggered axial relation, then during one revolution the same quantity of fluid will be conveyed in four places K, L, M, N in succession. This quantity can be adjusted by turning one cam member relative to the other. The places of conveyance K and M are situated in the working plane G, the places of conveyance L and N in the working plane F.

Figure 15:
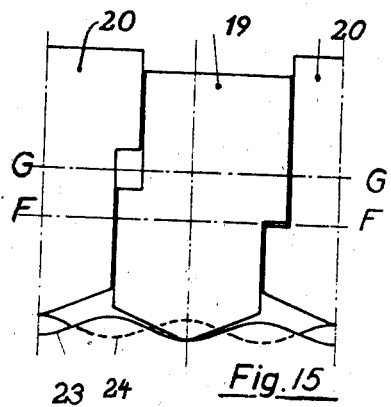
Figure 16:
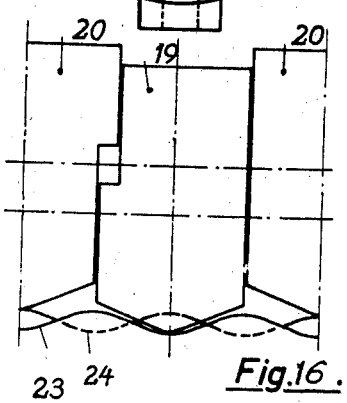

Fig. 15 illustrates the development of the pistons in the latter case. If an odd number of conveying places is desired, only a single working chamber according to Fig. 16 is provided.

I wish it to be understood that I do not desire to be limited to the exact details of construction shown and described, for obvious modifications will occur to a person skilled in the art.

I claim:

1. A compressor or the like comprising in combination, a casing member formed with intake and exhaust ports enclosing a cylindrical chamber, a rotatable shaft member extending axially through said chamber, at least two substantially helically extending pistons surrounding said shaft within said chamber and overlapping each other, said pistons being connected to said shaft member to rotate therewith and to slide axially thereon, each piston having a fluid active surface opposite to a similar surface of the other piston, those surfaces being plane surfaces, the projections of which at right angles to the machine axis completely cover the cross-sectional area of the free space between the shaft and the casing wall, and cam members fixed to said casing member inside said chamber and contacting said pistons to force same to reciprocate axially with respect to each other in said chamber as said shaft member is rotated so as to cause said fluid active surfaces to alternately approach, and recede from, each other, said intake and exhaust ports being arranged to be alternately covered and uncovered by said pistons and to be successively connected with the space between said fluid active surfaces, as said pistons reciprocate.

2. The apparatus of claim 1, in which two pistons are combined to form a multiple piston, the turns of said pistons extending in the same direction.

3. The apparatus of claim 1, in which two pistons are combined to form a multiple piston, the turns of said pistons extending in opposite directions.

OTTO LUTZ.